(12) United States Patent
Hakansson

(10) Patent No.: US 6,725,661 B1
(45) Date of Patent: Apr. 27, 2004

(54) VALVE DEVICE

(75) Inventor: Nils Olof Hakansson, Stenkullen (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 09/959,920
(22) PCT Filed: May 9, 2000
(86) PCT No.: PCT/SE00/00912
§ 371 (c)(1),
(2), (4) Date: Feb. 11, 2002
(87) PCT Pub. No.: WO00/71874
PCT Pub. Date: Nov. 30, 2000

(30) Foreign Application Priority Data

May 10, 1999 (SE) .............................................. 9901695

(51) Int. Cl.[7] ................................................ F02B 33/44
(52) U.S. Cl. ......................... 60/611; 251/63.6; 251/83; 123/564
(58) Field of Search ............................... 251/63.6, 63.5, 251/63.4, 62, 83, 82; 60/611; 123/564

(56) References Cited

U.S. PATENT DOCUMENTS 3,729,020 A * 4/1973 Koci et al. .................. 251/63.6
4,791,906 A   12/1988 Ecomard
5,492,103 A    2/1996 Goto
5,586,744 A * 12/1996 Smith et al. .................... 251/83

FOREIGN PATENT DOCUMENTS

| CH | 440 834 | 1/1968 |
| EP | 0 398 379 | 11/1990 |
| EP | 0 829 626 | 3/1998 |

* cited by examiner

Primary Examiner—John Bastianelli
(74) Attorney, Agent, or Firm—Young & Thompson

(57) ABSTRACT

Valve device for evacuation of a gaseous medium under overpressure from a space (3) includes a valve housing (1a) with an opening (2) to the space (3); a valve disc (6) cooperating with a valve spindle (8), sealing the opening in the closed position of the valve and, disposed in a cylinder (12), a control plunger (13) which, via a spring, biases the spindle and thus the valve disc towards the closed position. When pressure medium with a predetermined control pressure is supplied, the plunger is lifted from the valve spindle, whereupon the force from a balancing spring (11) and the medium pressure in the space (3) act in the valve opening direction, while the force of the control pressure acting on the spindle (8) loads the valve disc in the closing direction.

Figure 1:
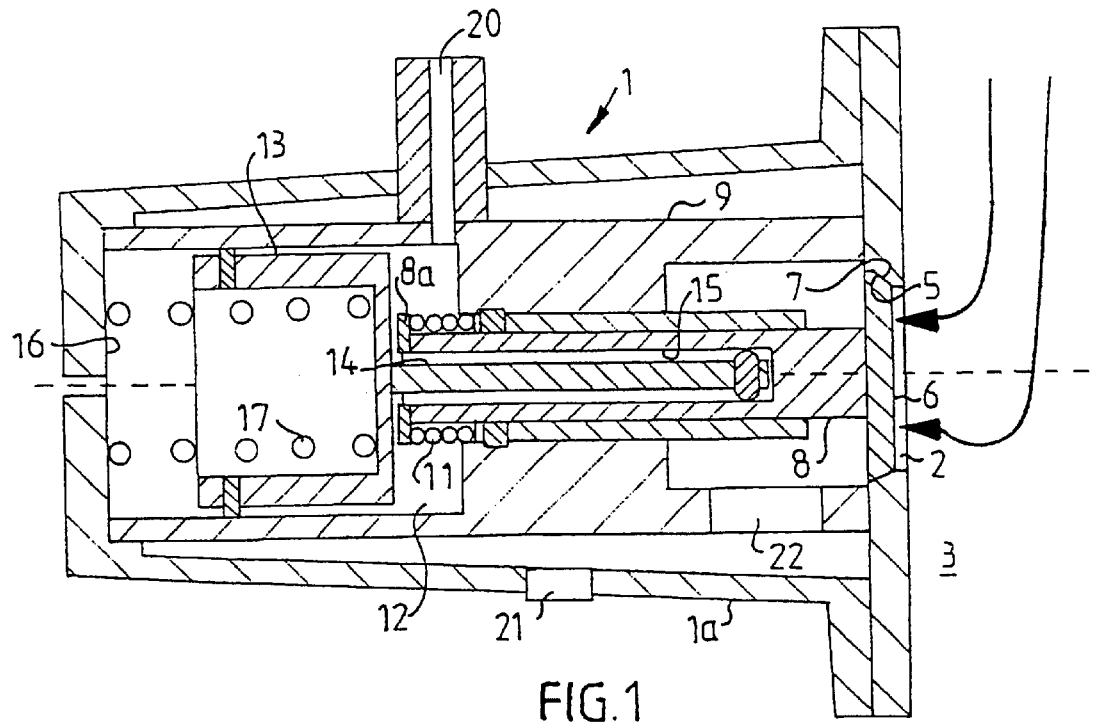

8 Claims, 2 Drawing Sheets

VALVE DEVICE

BACKGROUND OF THE INVENTION

The present invention relates to a valve device for evacuation of a gaseous medium with a pressure above atmospheric pressure from a space, comprising an atmosphere-communicating valve housing with a valve opening to said space, a valve body which is biased towards the closed position in contact with a valve seat about the valve opening by spring elements and towards the open position by the pressure of the gaseous medium, and a control plunger disposed in a cylinder, said plunger, upon supply of a control pressure medium to a cylinder chamber on its one side, being loaded by a force which counteracts the spring force.

In commonly occurring valve devices of this type, the plunger is joined directly via a valve spindle to a valve element in the form of a valve disc. The spring means biases the plunger, which in turn biases the valve disc to its closed position. When control pressure medium is supplied, the plunger is displaced in a direction so that it moves, via the spindle, the valve disc from the valve seat. In a known design, the valve disc and the valve seat are formed and arranged so that the spring presses against the plunger, which in turn presses the disc against the seat, while the pressure of the medium in the space as well as the control pressure in the cylinder chamber of the plunger act on the plunger in the opening direction, i.e. in the opposite direction In another known design, the spring presses against the plunger, which pulls the disc toward the valve seat. In this case, the force exerted by the gaseous medium acts in said space in the opposite direction, i.e. in the closing direction of the valve.

In the first example, the control pressure will be inversely proportional to the pressure of the gaseous medium, since this pressure acts in the opening direction. An increase in the set value of the medium pressure is thus obtained by reducing the control pressure. A homostable system is thereby achieved, since a disturbance in the form of an increase in the medium pressure in the space, for example, will result in the valve opening more and reducing the medium pressure without having to adjust the control pressure. One disadvantage of this valve is, however, the lack of precision since the spring mounting force tolerance and the spring constant will be included in the equilibrium equation. The spring must be mounted with a force sufficient to absorb the maximum overpressure of the medium in the space. Since the medium pressure and the control pressure act in the same direction, the control pressure range will only be circa one half of the medium pressure range, thus further reducing the precision.

In the second example, the control function is reversed, with the valve working in the opposite direction, i.e. closing automatically when there is medium pressure m the space, but it must be opened with the control pressure. This system is, however, completely unstable, since a disturbance where the medium pressure in the space increases also increases the closing force of the valve, which must immediately be dosed by increasing the control pressure. Systems functioning in this way are very difficult to precision-control.

SUMMERY OF THE INVENTION

A general purpose of the present invention is to achieve a valve device of the type described by way of introduction, which is kept closed by a spring force without supplying control pressure medium up to a predetermined medium pressure and through which, by supplying control pressure medium with a pressure up to a predetermined interval a medium pressure can be maintained which is lower than said predetermined medium pressure. The construction of the valve shall be such that the control precision will be practically independent of spring tolerances and clamping forces, and the medium pressure increases with increasing control pressure within said interval.

An additional purpose of the present invention is to achieve a valve device of the type described by way of introduction, which is particularly suited for controlling the charge air pressure in an intake line from a turbo-compressor on a supercharged four-stroke internal combustion engine of turbo-compound type, which is provided with throttle valve means in the exhaust line between the engine exhaust outlet and its charge turbine.

This is achieved according to the invention by virtue of the fact that the plunger and the valve body are movable relative to each other and are biased in opposite directions by the control pressure medium, that first spring means bias, via the plunger, the valve body towards the closed position, that second spring means bias the valve body towards the open position, and that the spring forces of the first and second spring elements and the piston area and the area of the valve body exposed to the gaseous medium, are selected so that the first spring element, in the absence of control pressure medium, keeps the valve body in the closed position until a predetermined maximum pressure has been reached in said space, and that the valve body, upon supply of control pressure medium with a pressure within a predetermined pressure interval, opens the valve to maintain a gas medium pressure dependent on the control pressure within an interval, the upper limit of which is lower than said maximum pressure.

When using such a valve as a charge air pressure-regulating valve in a turbocharged combustion engine with exhaust braking function, the valve has a first function in engine drive and a second function in braking operation. During engine drive, the valve is held closed by the spring force up to a maximum permitted charge air pressure and then opens under the influence of the charge air pressure and thus limits the charge-air pressure. During engine braking, control compressed air is supplied first up to a pressure level balancing the closing force of the spring means. By then increasing the control pressure during engine braking from the balancing pressure and up to an upper predetermined control pressure level, the charge air pressure during engine braking can be varied within an interval which is optimal for engine braking.

By selecting the spring forces and said areas so that the pressure interval of the control pressure has an upper limit which several times higher than the maximum permitted charge pressure, there is achieved a high resolution and precision in the control of the valve.

BRIEF DESCRIPTION OF THE INVENTION

Figure 2:
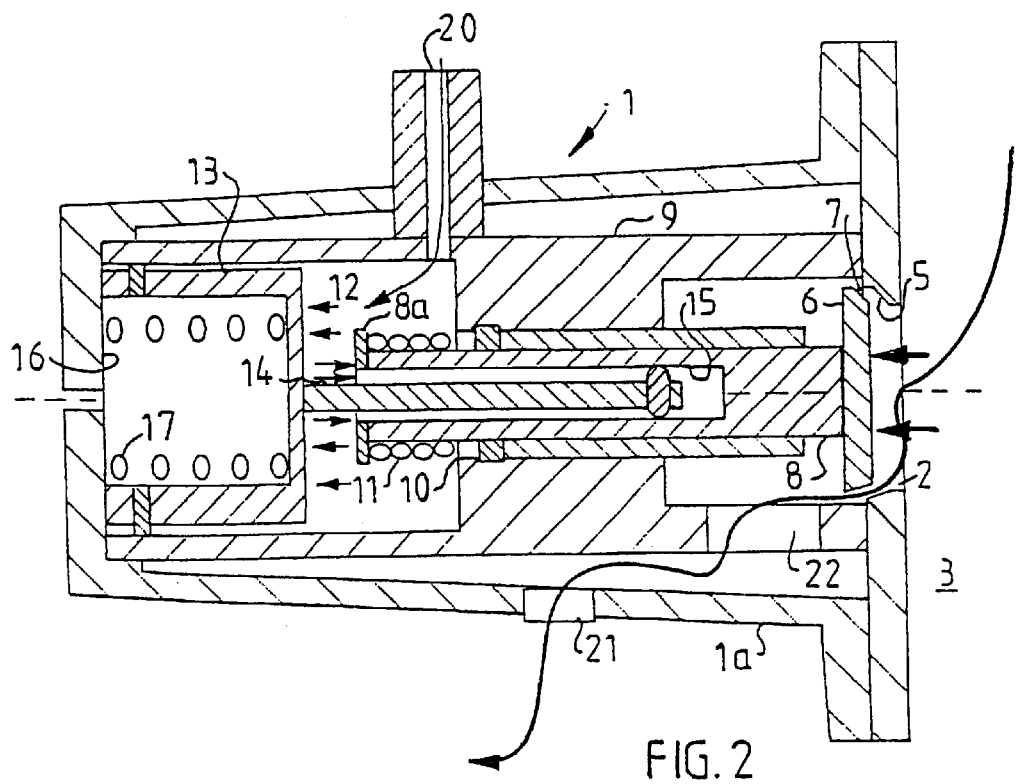
Figure 3:
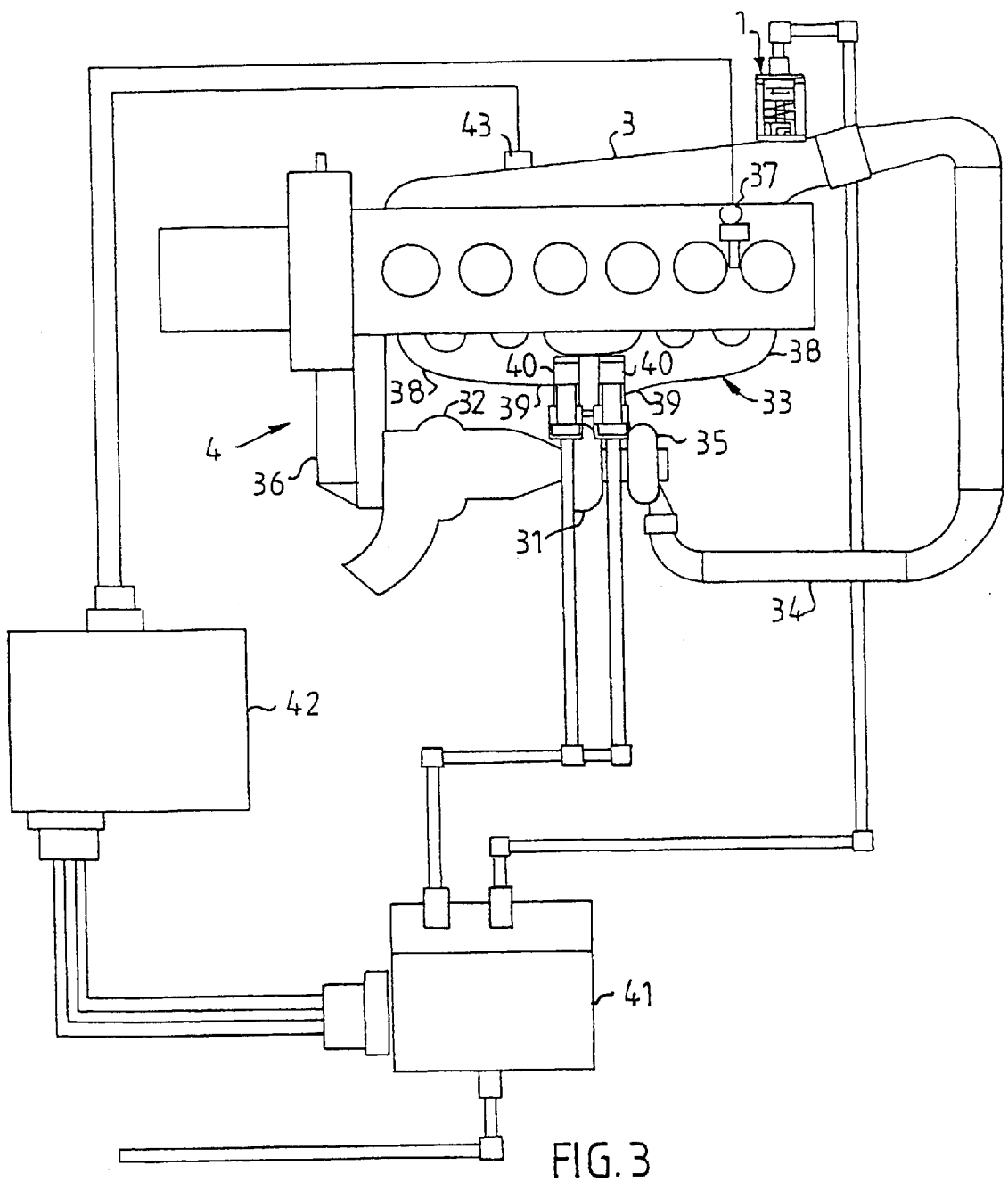

The invention will be described below in more detail with reference to examples shown in the accompanying drawings, where FIG. 1 shows a schematic longitudinal section through one embodiment of a valve according to the invention particularly suited for controlling charge air pressure and in a position for engine drive, FIG. 2 shows the valve in FIG. 1 in a position for brake mode operation, and FIG. 3 is a schematic representation of a four-stroke turbo-compound engine with a valve according to the invention.

DETAILED DESCRIPTION OF THE INVENTION

FIGS. 1 and 2 show one embodiment of a valve, generally designated 1, according to the invention, which has a valve housing 1a with an opening 2, which opens into a space 3, which can be interior of the inlet manifold 3 of the engine, generally designated 4 in FIG. 3. This engine 4 is a six-cylinder four-stroke diesel engine of turbo-compound type. The opening 2 has a conical valve seat 5, against which a disc 6 with a corresponding conical edge 7 lies in the closed position of the valve, as shown in FIG. 1. The valve disc 6 is solidly joined to a valve spindle 8, which is displaceably mounted in a central valve body 9. Between a flange 8a on the spindle 8 and an end surface 10 on the central valve body 9, a helical spring 11 is clamped, which biases the spindle 8, and thus the valve disc 6 in the direction from the valve seat 5, i.e. in the opening direction. In a cylindrical space 12 in the central valve body 9, a plunger 13 is displaceably mounted. The plunger 13 in the example shown is solidly joined to a plunger spindle 14, inserted in a bore 15 in the valve spindle 8. Between the plunger 13 and an end surface 16 of the housing 1, there is a helical spring 17 which, via the plunger 13 and the end surface of the plunger spindle 14, biases the valve spindle 8 and thus the valve disc 6 towards a closed position. The housing 1 has an inlet 20 for pressure medium, preferably compressed air, which opens into the cylindrical space 12 on the side of the plunger opposite to the spring 17. The housing 1 has an outlet 21 to the atmosphere which, via an opening 22 in the central valve body 9 and the valve opening 2, can be connected to the space 3.

FIG. 3 shows the turbo-compound engine 4 with the valve 1 according to the invention for control of the charge pressure from a turbo-compressor unit, comprising a first turbine step 31 and a second turbine step 32 connected to the exhaust manifold 33 of the engine. The first turbine step 31 is a small high-pressure step, which drives a compressor 35 coupled to the engine intake conduit 34, while the second turbine step 32 is a larger low-pressure step, which is coupled to the engine crankshaft via a transmission 36. The engine has a schematically indicated compression braking device 37, which can be of the type shown and described in SE 466 320, and by means of which the engine cylinders, during the latter portion of the inlet stroke, as during the latter portion of the compression stroke, can be connected to the engine exhaust manifold to increase the engine braking effect. The engine has an exhaust manifold, which is divided into two partial manifolds 38, the outgoing exhaust conduits 39 of which come together before the inlet into the first turbine step 31. In each exhaust conduit 39, there is arranged a throttle valve 40, which has a completely open position and a throttle position, in which the flow-through area of the conduit 39 is reduced to create a counterpressure in the exhaust manifold during engine braking. With the throttle valve means upstream of the turbine step 31 and the throttle area adapted to the turbine area, the turbo-compressor unit can provide supercharging even during braking operation. It is true that the pistons will be supplied with energy from the gas during the intake stroke, but the work which the piston must perform against the gas during the compression stroke will be so much higher that the net effect will be a higher braking power. Furthermore, greater volumes of gas circulate through the engine when there is supercharging in brake mode, which means that greater amounts of heat will be carried out by the exhaust which is an advantage over installations where the heat is substantially removed by the coolant.

The throttle valves 40 are on/off valves, while the valve 1 is preferably a PWM-valve, which is supplied with compressed air from a control valve unit 41, which is controlled by a control computer 42, into which signals are fed i.a. from a charge pressure sensor 43. For a more detailed description of the construction of the throttle valve, its function and control in various operating states, reference is made to SE 9504542-3.

Below there is described in more detail the construction of the valve 1, its function and control, with reference to FIGS. 1 and 2, where FIG. 1 shows the position of the components during engine drive mode, and FIG. 2 shows a corresponding view during braking mode. During engine drive more, no compressed air is supplied to the inlet 20, and this means that there will be no control pressure in the cylinder chamber 12 on the side of the plunger facing the valve spindle 8. The spring 17 will in this case press, via the plunger 13, the plunger spindle 14 and the valve spindle 8, the valve disc 6 against its seat 5. The only force biasing the valve towards its closed position is thus the force from the spring 17. In the opposite direction, there is acting a force which is the product of the area of the valve disc 6 and the charge air pressure in the inlet manifold 3, plus the force of the spring 11. The spring forces and the area of the valve disc are adapted to each other so that the valve begins to open when a predetermined maximum-permitted charge pressure has begun to be exceeded. To describe the engine installation, a typical value of this pressure can be circa 2,3 bar overpressure.

For the transfer to engine-braking mode, the charge air pressure must be reduced. For the engine installation described, a typical pressure interval, within which the charge air pressure is regulated during braking mode, is circa 0,3–1,1 bar overpressure, depending on the desired braking power. During transition to braking mode, compressed air is supplied to the cylinder chamber 12 through the inlet 20. In order to relieve the valve spindle 8 from the force of the spring 17, for the engine installation described, piston and spindle areas as well as spring forces have been selected so that a control pressure of circa 3 bar overpressure provides a charge pressure of circa 0,3 bar overpressure. Since the control pressure also acts on the spindle 8 in the closing direction of the valve with a force, which is equal to the product of the control pressure and the cross-sectional area of the spindle 8, the closing force of the valve and thus the charge air pressure will increase with increasing control pressure. In the example shown here with a charge air pressure of 0,3 bar at a control pressure of 3 bar, there was obtained the above mentioned upper limit of 1,1 bar for the charge air pressure during engine braking at a control pressure of circa 7,8 bar overpressure.

With this direct action in braking mode, the engine braking system will be homo-stable, i.e. a disturbance causing the charge air pressure, for example, to increase, will cause the valve to open more so that the pressure will drop. Since the control pressure acts via a geometric area ratio directly against the charge air pressure, the precision will be independent of spring tolerances, with the exception of the balancing spring 11, which displaces in parallel the zero-point for the control pressure to 3 bar.

The valve according to the invention is, of course, not limited to the use described above as a control valve for controlling the charge air pressure in a supercharged internal combustion engine, even if these properties provide particular advantages for this particular purpose. It can also be used, of course, in other contexts, where its particular construction and function are useful.

What is claimed is:

1. Valve device for evacuation of a gaseous medium with a pressure above atmospheric pressure from a space (3), comprising an atmosphere-communicating valve housing (1) with a valve opening (2) to said space, a valve body (6) which is biased towards the closed position in contact with a valve seat (5) about the valve opening by spring elements (17) and towards the open position by the pressure of the gaseous medium, and a control plunger (13) disposed in a cylinder (12), said plunger, upon supply of a control pressure medium to a cylinder chamber on its one side, being loaded by a force which counteracts the spring force, characterized in that the plunger (13) and the valve body (6) are movable relative to each other and are biased in opposite directions by the control pressure medium, that first spring means (17) bias, via the plunger, the valve body towards the closed position, that second spring means (11) bias the valve body towards the open position, and that the spring forces of the first and second spring elements and the plunger area and the area of the valve body exposed to the gaseous medium, are selected so that the first spring means, in the absence of control pressure medium, keeps the valve body in the closed position until a predetermined maximum pressure has been reached in said space, and that the valve body, upon supply of control pressure medium with a pressure within a predetermined pressure interval, opens the valve to maintain a gas medium pressure dependent on the control pressure within an interval, the upper limit of which is lower than said maximum pressure.

2. Valve device according to claim 1, characterized in that the spring forces and said areas are selected so that the pressure interval of the control pressure medium has a lower limit, which is higher than said maximum pressure.

3. Valve device according claim 1, characterized in that the spring forces and said areas are selected so that the pressure interval of the control pressure medium has an upper limit, which is several times higher than the maximum pressure.

4. Valve device according to claim 1, characterized in that the piston area and the spring force of the first spring element (17) are adapted to each other so that the control pressure force on the plunger (13) exceeds the spring force, when the control pressure has reached circa 3 bar overpressure.

5. Valve device according to claim 1, characterized in that the area of the valve body (6) and the spring force of the second spring (11) are adapted to each other so that the gas medium pressure is kept at circa 0,3 bar overpressure at a control pressure of circa 3 bar overpressure and at circa 1,1 bar overpressure at a control pressure of circa 7,8 bar overpressure.

6. Valve device according to claim 1, characterized in that the valve body contains a valve disc (6) and a valve spindle (8) joined thereto, then the second spring element comprises at least one helical spring (11), which is clamped between a shoulder (8a) on the spindle and a surface (10) on the valve housing (1) and biases the valve disc in the direction from the valve seat, that the first spring element comprises at least one helical spring (17), which is clamped between a surface (16) on the housing and a surface on the plunger (13), so that, in the absence of control pressure, the plunger mechanically biases the valve disc towards the valve seat, and that the control pressure acts on the end surfaces facing each other of the plunger and the spindle, so that the forces acting through the control pressure on the plunger and the spindle are counter to the forces from the spring elements.

7. Valve device according to claim 1, characterized in that the opening (2) of the valve housing (1a) opens into a charge air conduit (3) from a turbo-compressor (31) on a supercharged four-stroke internal combustion engine (4).

8. Valve device according to claim 1, characterized in that the opening (2) of the valve housing (1a) opens into a charge air conduit (3) from a turbo-compressor (31) on a supercharged four-stroke internal combustion engine (4) of turbo-compound type, which is provided, in the exhaust conduit (39) between the exhaust outlet from the engine and its charge turbine (31), with throttle valve means (40).

* * * * *